United States Patent
Toyoda

(10) Patent No.: US 7,212,302 B2
(45) Date of Patent: May 1, 2007

(54) INTERNET FACSIMILE APPARATUS AND E-MAIL COMMUNICATION METHOD

(75) Inventor: Kiyoshi Toyoda, Kunitachi (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 836 days.

(21) Appl. No.: 10/183,430

(22) Filed: Jun. 28, 2002

(65) Prior Publication Data

US 2002/0163673 A1    Nov. 7, 2002

Related U.S. Application Data

(60) Continuation of application No. 09/495,516, filed on Feb. 1, 2000, now Pat. No. 6,441,916, which is a division of application No. 09/184,902, filed on Nov. 3, 1998, now Pat. No. 6,094,277.

(30) Foreign Application Priority Data

May 15, 1998   (JP)   ................... 10-133948

(51) Int. Cl.
*G06K 15/00*   (2006.01)
*H04N 1/00*   (2006.01)
(52) U.S. Cl. .................... 358/1.15; 358/402
(58) Field of Classification Search ............... 358/1.15, 358/434, 402, 403, 407, 440, 468, 448, 400, 358/500; 709/200, 206, 239, 217, 219, 235, 709/246
See application file for complete search history.

(56) References Cited

U.S. PATENT DOCUMENTS

| | | |
|---|---|---|
| 5,406,557 A | 4/1995 | Baudoin |
| 5,555,100 A | 9/1996 | Bloomfield |
| 5,555,346 A | 9/1996 | Gross et al. |
| 5,608,874 A | 3/1997 | Ogawa et al. ............... 704/246 |
| 5,632,011 A | 5/1997 | Landfield et al. ........... 704/206 |
| 5,647,002 A | 7/1997 | Brunson |
| 5,751,960 A | 5/1998 | Matsunaga |
| 5,802,314 A | 9/1998 | Tullis et al. |

(Continued)

FOREIGN PATENT DOCUMENTS

EP   0322105   6/1989

(Continued)

OTHER PUBLICATIONS

English Language Abstract of JP 2-185158.

(Continued)

*Primary Examiner*—Gabriel I. Garcia
(74) *Attorney, Agent, or Firm*—Greenblum & Bernstein, P.L.C.

(57) ABSTRACT

An e-mail communication apparatus connected an administrator via a network includes a receiver that receives e-mail from a sender over the network and a detector that detects whether or not the received e-mail can be handled, based upon whether the e-mail can be opened in the e-mail communication apparatus. A printer prints the received e-mail when the detector detects that the e-mail can be handled in e-mail communication apparatus and a transmitter transmits a notice e-mail to the administrator when the detector detects that the e-mail cannot be handled in e-mail communication apparatus. The receiver, the detector and the printer are integrated in the e-mail communication apparatus.

10 Claims, 7 Drawing Sheets

U.S. PATENT DOCUMENTS

| | | | |
|---|---|---|---|
| 5,805,810 A | 9/1998 | Maxwell | |
| 5,812,278 A | 9/1998 | Toyoda et al. | |
| 5,859,967 A | 1/1999 | Kaufeld et al. | |
| 5,881,233 A | 3/1999 | Toyoda et al. | |
| 5,903,723 A | 5/1999 | Beck et al. | |
| 5,903,901 A | 5/1999 | Kawakura et al. | |
| 5,905,777 A | 5/1999 | Foladare et al. | |
| 5,905,783 A * | 5/1999 | Tonegawa | 379/100.07 |
| 5,974,449 A | 10/1999 | Chang et al. | |
| 6,023,700 A | 2/2000 | Owens et al. | |
| 6,088,125 A | 7/2000 | Okada et al. | |
| 6,094,277 A | 7/2000 | Toyoda | |
| 6,128,101 A | 10/2000 | Saito | |
| 6,137,597 A | 10/2000 | Kanaya | |
| 6,157,706 A | 12/2000 | Rachelson | |
| 6,266,160 B1 | 7/2001 | Saito et al. | |
| 6,307,643 B1 * | 10/2001 | Okada et al. | 358/1.15 |
| 6,351,316 B2 | 2/2002 | Saito et al. | |
| 6,441,916 B1 | 8/2002 | Toyoda | |
| 6,744,736 B1 * | 6/2004 | Ito | 370/245 |

FOREIGN PATENT DOCUMENTS

| | | |
|---|---|---|
| EP | 836315 | 4/1998 |
| EP | 0836315 | 4/1998 |
| JP | 9116728 | 3/1986 |
| JP | 2-185158 | 7/1990 |
| JP | 6-141041 | 5/1994 |
| JP | 7-66957 | 3/1995 |
| JP | 7-115521 | 5/1995 |
| JP | 7-203160 | 8/1995 |
| JP | 7-212395 | 8/1995 |
| JP | 8-111688 | 4/1996 |
| JP | 8-139750 | 5/1996 |
| JP | 8244326 | 9/1996 |
| JP | 99034 | 1/1997 |
| JP | 9-65100 | 3/1997 |
| JP | 9-116728 | 5/1997 |
| JP | 9-247335 | 9/1997 |
| JP | 9247336 | 9/1997 |
| JP | 1070643 | 3/1998 |
| JP | 10117210 | 5/1998 |
| JP | 10164124 | 6/1998 |
| WO | 97/ 38523 | 10/1997 |
| WO | 9738523 | 10/1997 |

OTHER PUBLICATIONS

English Language Abstract of JP 9-247335.
English Language Abstract for JP Appln. No. 7-66957.
English Language Abstract for JP Appln. No. 7-203160.
English Language Abstract for JP Appln. No. 7-212395.
English Language Abstract for JP Appln. No. 8-111688.
English Language Abstract for JP Appln. No. 8-139750.
English Language Abstract for JP Appln. No. 9-9034.
English Language Abstract for JP Appln. No. 9-65100.
English Language Abstract for JP Appln. No. 10-117210.
English Language Abstract for JP Appln. No. 8-242326.
English Langugage Abstract for JP Appln. No. 9-116728.
English Language Abstract for JP Appln. No. 6-141041.
English Language Abstract for JP Appln. No. 7-115521.
English Language Abstract for JP Appln. No. 10-164124.
Patel et al., "The Multimedia Fax-MIME Gateway," IEEE, pp. 64-70, 1994.
English Language Abstract for JP Appln. No. HEI 9-247336.
English Language Abstract for JP Appln. No. HEI 10-70643.
K. Toyoda et al., "A Simple Mode of Facsimile Using Internet Mail", IETF Request for Comments, No. 2305, Mar. 1998, pp. 1-13.
K. Moore et al., "An Extensible Message Format for Delivery Status Notifications", IETF Request for Comments, No. 1894, Jan. 1996, pp. 1-39.

* cited by examiner

| HEADER |
| IFD |
| IMAGE DATA |
| IFD |
| IMAGE DATA |

IFD(IMAGE FILE DIRECTORY)

| THE FOLLOWING ATTRIBUTES ARE DESCRIBED: | MINIMUM SET |
| • PAPER WIDTH | 1728dots |
| • COMPRESSION METHOD | MH |
| • IS THE DATA START LSB OR MSB? | LSB |
| • DATA STARTING OFFSET | |
| • NUMBER OF BYTES OF DATA | |
| ETC | |

HEADER

- DATA CREATED BY WHAT KIND OF CPU?
  IS IT INTEL BASED OR MOTOROLA BASED?
- START IFD OFFSET

INTERNET FACSIMILE APPARATUS AND E-MAIL COMMUNICATION METHOD

This application is a Continuation of U.S. application Ser. No. 09/495,516, filed on Feb. 1, 2000 now U.S. Pat. No. 6,441,916, which is a Division of U.S. patent application Ser. No. 09/184,902, filed on Nov. 3, 1998 now U.S. Pat. No. 6,094,277, the contents of which are herein expressly incorporated by reference in their entireties.

BACKGROUND OF THE INVENTION

1. Field of the Invention

The present invention relates to Internet facsimiles that allow facsimile transmissions with image information attached to E-mail.

2. Description of the Related Art

Recently, it is a common practice to exchange E-mail between personal computers (PC) over a local area network (LAN) or the Internet. Usually, Exchange of E-mail is implemented by connecting LAN to a PC which has E-mail software installed and by dialing up a contracted provider.

Furthermore, a facsimile type E-mail apparatus is put into practice as simple E-mail means without using a PC. This kind of facsimile type E-mail apparatus is called Internet FAX. The Internet FAX is a facsimile provided with a function to communicate E-mail over the Internet, which transmits E-mail accompanied mainly by image information scanned by a scanner in attached file format.

There may be cases where image data files attached to received E-mail cannot being opened depending an some functions incorporated in the Internet FAX. Being unable to open the attached files means failing to receive image information correctly and this will require an error message to be sent to the sender.

Machines which has a sufficient storage capacity store, such as PC, all image information irrespective of whether it is possible to open the image information or not, and thus they can re-attach the image information that could not be opened to the E-mail and send it back to the sender.

However, with the Internet FAX, there is a limitation to the memory capacity for buffering received mail and only the amount of data corresponding to the buffer memory capacity is taken out of a mail server and that portion of data is opened and printed out in page units. When image information with a large capacity is attached, it is difficult to store all image information in the Internet FAX. In this case, when it fails to open an attached file containing the image information, it is not possible to re-attach the image information that could not be opened to the E-mail and send it back to the sender.

Furthermore, since a normal facsimile transmits data according to a facsimile transmission protocol, the facsimile on the sender side can confirm the delivery of the message. However, when image information is transmitted in E-mail format using the Internet FAX, it is not possible to confirm the delivery of the mail according to a facsimile transmission protocol.

As described above, the conventional Internet FAX is unable to notify the sender of the fact that the files attached to the received E-mail could not be opened or that data has been received successfully.

SUMMARY OF THE INVENTION

An objective of the present invention is to provide an Internet facsimile that can accurately and simply notify the sender of the data that resulted in an error or the data correctly received even When it is not equipped with a large-capacity memory or hard disk.

Thus, the present invention firstly provides an Internet facsimile apparatus comprising transmitting/receiving means for transmitting/receiving E-mail to/from a network, identification data creating means for creating identification data from received mail and notification means for creating reply mail including said identification data and notifying it to the sender of said received mail.

Secondly, the present invention provides an Internet facsimile apparatus comprising transmitting/receiving means for transmitting/receiving E-mail to/from a network, and account name notification means for notifying an account name to a specific terminal connected via the network in the case that files attached to the received mail cannot be opened.

Thirdly, the present invention provides an E-mail communication method for the Internet facsimile comprising the steps of receiving E-mail from a network, creating identification data from the received mail, creating reply mail including said identification data, and notifying said reply mail to the sender of said received mail.

Fourthly, the present invention provides an E-mail communication method for the Internet facsimile comprising the steps of transmitting/receiving E-mail to/from a network, and notifying an account name to a specific terminal connected via the network in the case that files attached to the received mail cannot be opened.

DETAILED DESCRIPTION OF THE PREFERRED EMBODIMENTS

With reference now to the attached drawings, the embodiment of the present invention is explained below.

Figure 1:
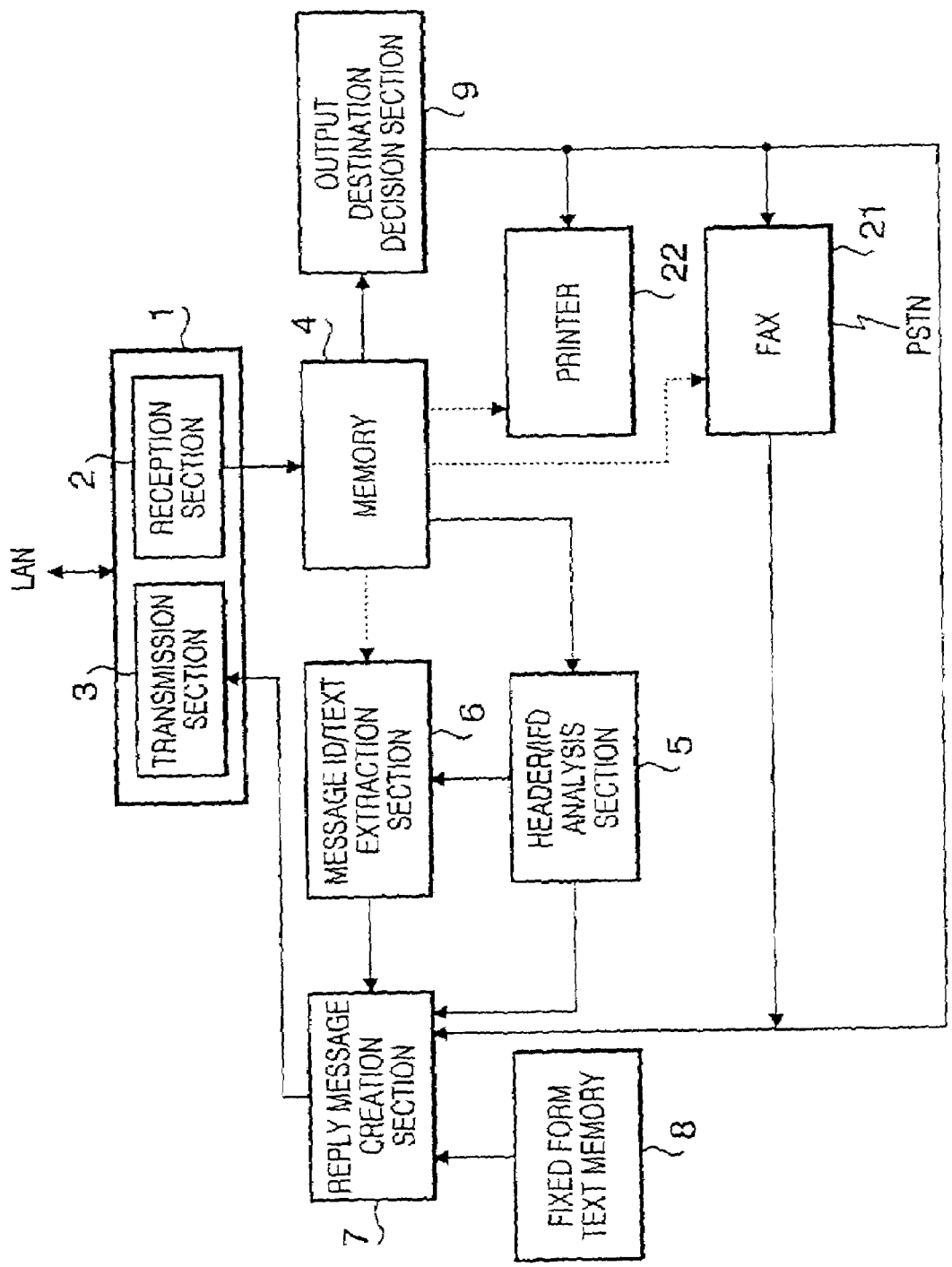
FIG. 1 illustrates a functional section diagram of an Internet FAX according to an embodiment of the present invention.

FIG. 1 illustrates a functional section of the Internet FAX according to the embodiment of the present invention. The present Internet FAX transmits/receives E-mail via E-mail communication section 1. E-mail communication section 1 comprises reception section 2 that performs reception-related processing of E-mail and transmission section 3 that performs transmission-related processing of E-mail. E-mail data received via reception section 2 is buffered in memory 4. The header information and IFD information of the received E-mail data stored in memory 4 is analyzed by header/IFD analysis section 5. According to the analysis result, header/IFD analysis section 5 gives notification type data, corresponding to various kinds of notification such as error message and delivery status notification message, to message ID/text extraction section 6 or reply message creation section 7. Message ID/text extraction section 6 extracts the message ID and/or mail head text from the received E-mail data according to the notification type data. Reply message creation section 7 creates various messages such as error message and delivery status notification message using the message ID and/or mail head text, etc. Fixed form text for a message to be notified to the sender is stored in fixed form text memory 8.

Furthermore, output destination decision section 9 decides the output destination of the received E-mail from the mail address of the received E-mail data stored in memory 4. When the final destination is another G3 FAX, it transfers the opened image information together with the destination telephone number to FAX 21. When the final destination is itself, it inputs the received E-mail to printer 22.

Figure 2:
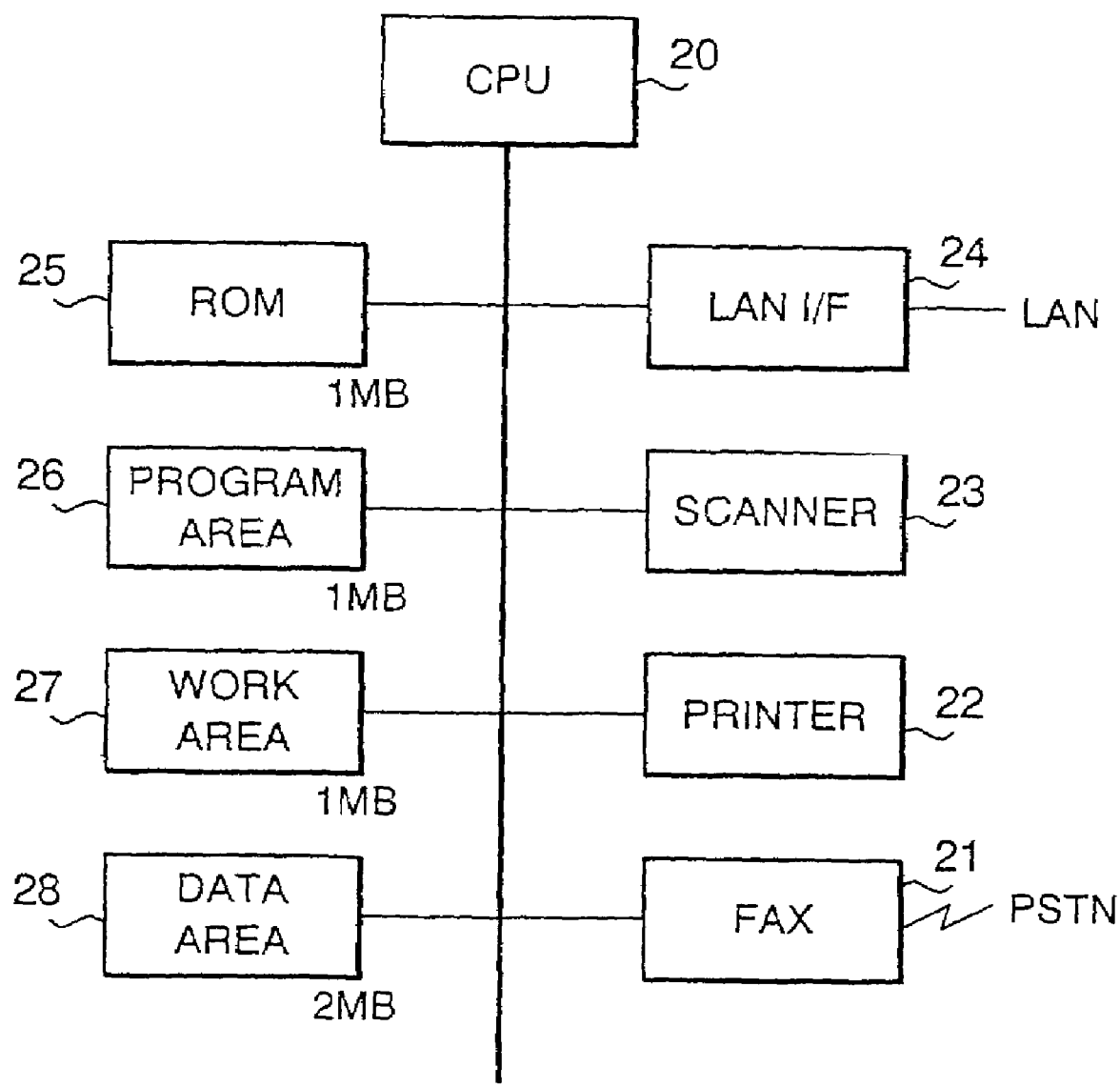
FIG. 2 illustrates a hardware configuration diagram of the Internet FAX according to the above embodiment.

FIG. 2 illustrates an outline of hardware making up the Internet FAX according to the present embodiment. As shown in said figure, the Internet FAX comprises CPU 20 that controls the operation of the entire apparatus, FAX 21 that performs FAX transmission/reception according to a normal facsimile protocol, printer 22, scanner 23 that scans a document and incorporates image information of the document, LAN interface section 24 that connects with the Internet, and ROM 25 that stores programs, etc. to operate as a normal facsimile. It further incorporates RAM comprising program area 26 that stores a program to operate as an Internet FAX, work area 27, and data area 28. The functions shown in FIG. 1 are carried out when CPU 20 executes a program stored in program area 26.

Figure 3:
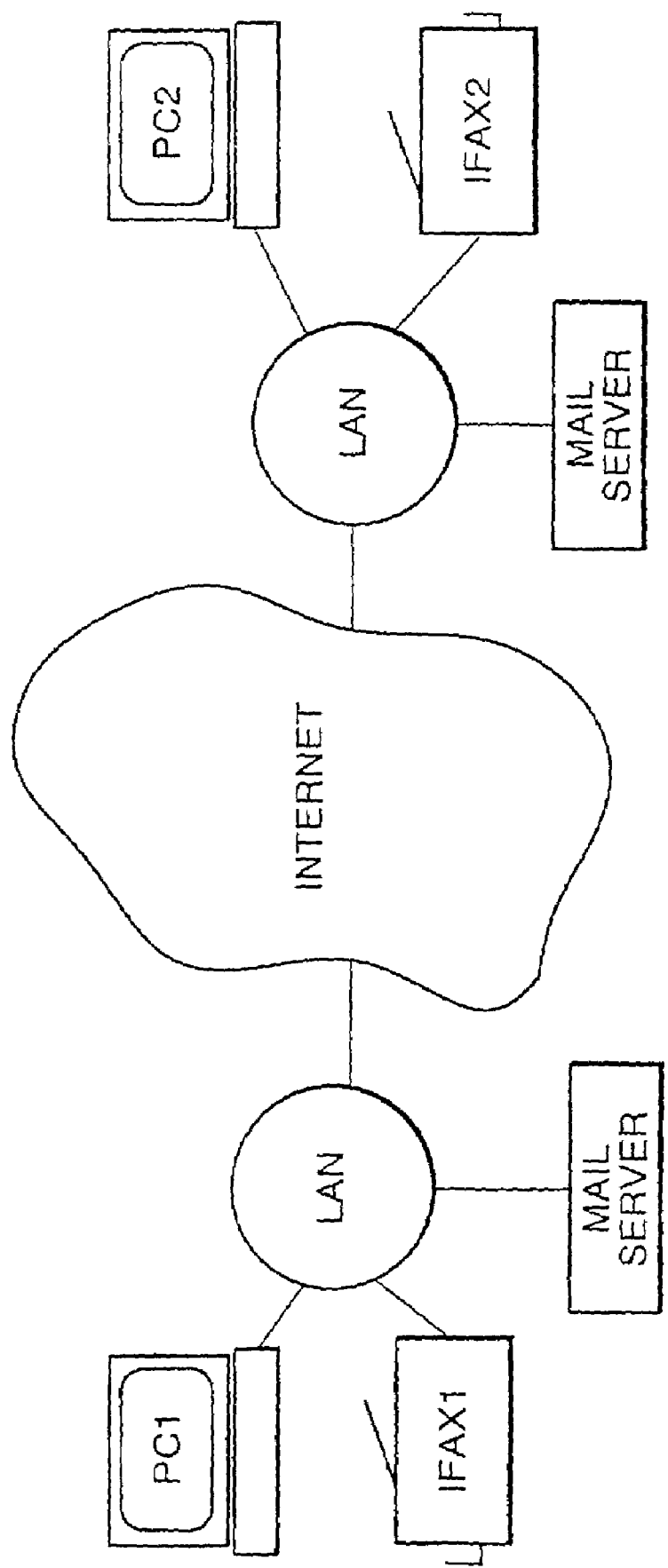
FIG. 3 illustrates a system configuration diagram of the Internet FAX according to the above embodiment.

FIG. 3 illustrates a conceptual diagram of the network system including the Internet FAX in the present embodiment. The IFAX1 and IFAX2 are the Internet FAX apparatuses in the present embodiment and PC1 and PC2 are personal computers with an E-mail function. Data created or read in each terminal are transmitted to a target terminal via a mail server. The protocol used by the IFAX to receive mail is POP (Post Office Protocol). Therefore, the mail server also stores mail that cannot be handled by the IFAX and in order to return an error to the sender, the IFAX returns the mail.

Then, the operation of the embodiment configured as shown above is explained below.

The Internet FAX converts image information scanned by scanner 23 to a file in TIFF-F file format and attaches it to E-mail. The Internet FAX sets the destination Internet FAX or PC E-mail address in E-mail. When the image information is further transferred to a G3 FAX, the following E-mail address is set.

passwd#1234556@ifax.mgcs.co.jp "passwd" indicates transmission to the G3 FAX and the number between "#" and "@" indicates the FAX number of the transfer destination. Granting the password=passwd only to the users who are authorized to use the Internet FAX as a relay apparatus prevents unauthorized use by other people. E-mail is sent to a mail server in which a mailbox of the destination terminal, e.g., Internet FAX or PC, is set.

Figures 5, 6A, 6B:
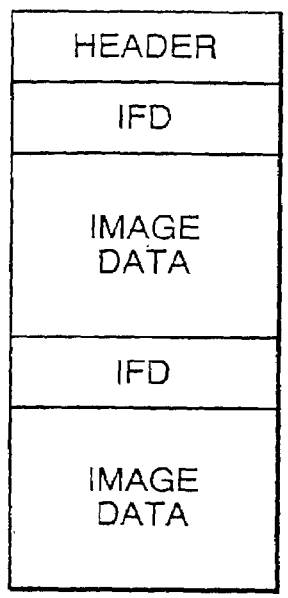
FIG. 5 illustrates a TIFF-F file configuration diagram.
FIGS. 6A and 6B illustrate a specific example of IDF and header.

FIG. 5 shows a TIFF-F file format, a file format used to attach image information to E-mail. The top of a TIFF-F file is occupied by a header, followed by a number of pairs of IFD (Image File Directory) and data corresponding to one page. As shown in FIG. 6, the header stores type data indicating the type of CPU by which the data was registered and the offset up to the start IFD. The way words are expressed depends on the type of CPU. The IFD contains data such as the paper width, number of vertical lines, compression method, bit (MSB or LSB) placed to the left of data, data offset, number of bytes of data, etc.

Since the Internet FAX in particular cannot perform negotiations, it is designed to insure communications with minimum functions of the Internet FAX. What specifies this minimum functions is called "minimum set." The minimum set specifies the CPU to be an Intel CPU, the paper width to be 1728, the data array to be LSB and the compression method to be MH.

Figure 4:
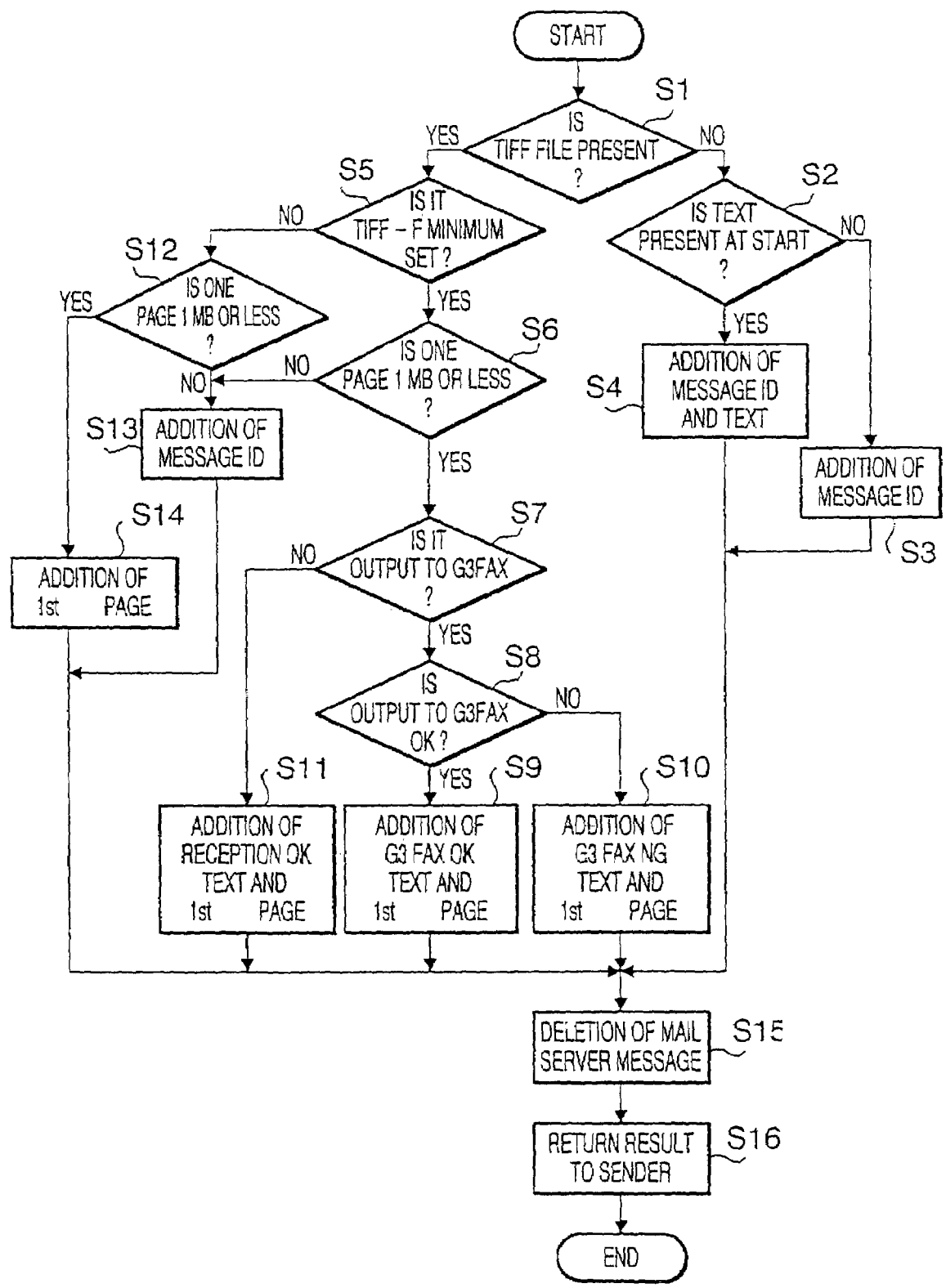
FIG. 4 illustrates a flow chart showing operation details of the Internet FAX of the above embodiment.

With reference now to the flow chart shown in FIG. 4, the operation of the Internet FAX during mail reception is explained below. In the present embodiment, the Internet FAX periodically accesses the mail server to check whether new E-mail has been received. When it detects newly received mail, the Internet FAX download the received E-mail data from the mail server and stores them in data area 28 to the full. Since data area 28 has a capacity of 1 MB, when the E-mail text and a TIFF-F file are attached, the data containing the header of the TIFF-F file and the IFD of the first page are stored in data area 28.

Header/IFD analysis section 5 decides whether there are any TIFF-F files from the mail data stored in the data area of memory 4 (S1). When there is no TIFF-F file, Header/IFD analysis section decides whether any text is included in the beginning of the E-mail (S2). When there is no text, header/IFD analysis section 5 notifies the type of error message corresponding to the case where there is neither TIFF-F file nor text to message ID/text extraction section 6.

Message ID/text extraction section 6 extracts information to identify the received E-mail from memory 4 according to the type of error message. Since this is an error message when there is neither TIFF-F file nor text, it extracts "message ID" of the sender from memory 4. The extracted "message ID" is handed over to reply message creation section 7.

Reply message creation section 7 reads out the fixed form text data of the error message corresponding to the type of error message input from the header/IFD analysis section 5, from fixed form text memory 8. Reply message creation section 7 creates reply mail data by adding the "message ID" given from message ID/text extraction section 6 to the reply message of this extracted error message (S3). The reply message contains a message indicating "data contained in this mail cannot be handled by IFAX." This E-mail is sent to the sender address described in the header of the received E-mail (S16).

In this way, when the sender receives the error notification E-mail above, a message indicating "data contained in this mail cannot be handled by IFAX" and the "message ID" of the mail are presented. In this case, since the sender is probably to be a PC, the "message ID" of the transmitted E-mail has been stored. Therefore, it is possible to identify the transmitted mail When the "message ID" is found.

In step S2 above, when header/IFD analysis section 5 recognizes that there is text at the beginning of the received E-mail, it notifies the type of error message corresponding to the case where there is no TIFF-F file but there is text to message ID/text extraction section 6 and reply message creation section 7. When message ID/text extraction section 6 receives the error message type, it extracts the text at the beginning of the received E-mail in addition to the "message ID" from memory 4 and hands it over to reply message creation section 7.

Reply message creation section 7 extracts a message indicating "data contained in this mail cannot be handled by IFAX" from fixed form text memory 8 and creates reply message data by adding the "message ID" and text given from message ID/text extraction section 6 to this error message (S4). It then transmits this reply message data to the sender by E-mail (S16).

When the sender receives the error notification E-mail above, the message indicating "data contained in this mail cannot be handled by IFAX," the "message ID" of the mail and the text at the beginning of the mail are presented. Presenting the text at the beginning of the reply message makes it easier to identify the transmitted data.

On the other hand, in above step S1, when header/IFD analysis section 5 decides that the received E-mail contains a TIFF-F file, it checks the IFD on the first page of the TIFF-F file to decide whether it is minimum set or not (S5). When data other than minimum set are received, it is necessary to issue an error message.

When header/IFD analysis section 5 identifies that the TIFF-F file is not minimum set, it decides whether or not one page is 1 MB or less (S12). To do this, it examines whether data area 28 contains one page or not from the offset and number of bytes of data set in the IFD. When data area 28 contains full one-page data, it can decide that one page is "1 MB or less." In this case, header/IFD analysis section 5 adds the start page stored in data area 28 to the reply mail and gives the error message type data to be returned to message ID/text extraction section 6 and reply message creation section 7. Message ID/text extraction section 6 extracts the start page stored in data area 28 from the received E-mail data and supplies the extracted start page to reply message creation section 7. Reply message creation section 7 extracts a message indicating "data contained in this mail cannot be handled by IFAX" from fixed form text memory 8 to create reply mail and at the same time combines the start page of the received mail with the reply mail text. When the entire start page cannot be contained, part of the start page is combined. This reply mail is transmitted from transmission section 3 to the sender (S16). This allows the sender who receives the reply mail to see the start page of the file attached to the E-mail transmitted by him/her in addition to the message indicating "data contained in this mail cannot be handled by IFAX," and easily identify the mail he/she transmitted.

In above step S5, when the data are decided to be minimum set of TIFF-F file, header/IFD analysis section 5 decides whether or not one page is 1 MB or less as in the case of above step S12 (S6). When it decides that one page exceeds 1 MB, it notifies error type data corresponding to this case to message ID/text extraction section 6 and reply message creation section 7 to attach the "Message ID" to the error fixed form text.

When the file attached to the E-mail is minimum set of TIFF-F file and one page is 1 MB or less, output destination decision section 9 decides the output destination (S7). Output destination decision section 9 recognizes the presence/absence of an indication of transmission to the G3 FAX from the character string written to the left of "@" of the mail address (destination). For example, when the mail address is as below:

passwd#1234556@ifax.mgcs.co.jp then, it is recognized that "passwd" indicates transmission to the G3 FAX and the number between "#" and "@" indicates the FAX number of the transfer destination. When there is no "passwd" the data are printed by printer 22.

Figure 7:
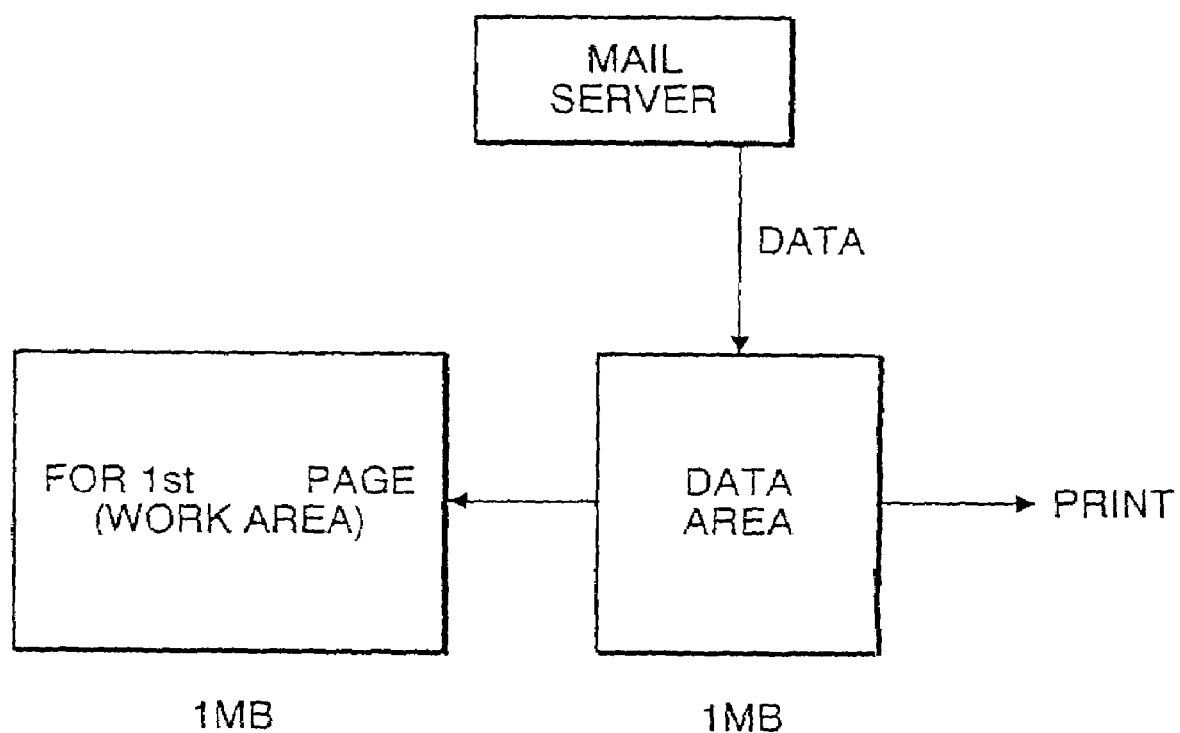
FIG. 7 illustrates an area configuration diagram of the memory.

With reference now to FIG. 7 how to use the memory area of memory 4 is explained. As described above, the received E-mail data are input to data area 28 of 1 MB as much as possible. In above steps S6 and S12, when it is decided that one page is 1 MB or less, the first page data stored in data area 28 are copied to the first page area secured in work area 27. After the start page is copied, the data are printed out and the remaining data are read from the mail server.

When all data are printed out normally, header/IFD analysis section 5 gives message ID/text extraction section 6 and reply message creation section 7 a reception OK command. Header/IFD analysis section 5 receives the reception OK command, then extracts the first page data and gives it to reply message creation section 7. Reply message creation section 7 reads a message corresponding to the reception OK command from fixed form text 8, then creates reply text and combines the first page given from header/IFD analysis section 5 with the E-mail text into one page (S11). This reply mail is transmitted as a delivery status notification message from the transmission section to the sender (S16). This allows the sender who received this reply mail to confirm that the image information sent by him/her has been received correctly from the message of successful delivery and the start page.

In above step S7, When a transfer to the G3 FAX is indicated, "passwd" is checked to decide whether it matches the password of the sender (S8) or not. When it does not match the password of the sender, the error message type data corresponding to this case is given to message ID/text extraction section 6 and reply message creation section 7. Upon receiving this message, reply message creation section 7 extracts a message indicating that the transfer to the G3 FAX resulted in NG from fixed form text memory 8 and creates reply mail. Then, reply message creation section 7 combines the start page extracted by message ID/text extraction section 6 with the main body of the reply mail (S10). This reply mail is transmitted to the sender (S16). This allows the sender to confirm that the transfer to the G3 FAX resulted in NG by receiving this reply mail.

Furthermore, When "passwd" matches the password of the sender in above step S8, output destination decision section 9 outputs a G3 FAX output OK message to reply message creation section 7 and at the same time it hands over the telephone number set between "#" and "@" of the mail address and the first PAGE to FAX 21. FAX 21 dials up the indicated telephone number and after the line is established, transmits image information in page units. When it confirms that the entire page has been transmitted correctly, FAX 21 notifies it to reply message creation section 7.

Upon receiving the message indicating that the entire page has been transmitted correctly from FAX 21, reply message creation section 7 reads out the message indicating that transmission from fixed form text memory 8 to the G3 FAX has been successful and creates reply mail, incorporates the start page from memory 4 via message ID/text extraction section 6 and attaches it to the reply mail (S9). This reply mail is transmitted from transmission section 3 to the sender (S16). This allows the sender to confirm by receiving this reply mail that the transfer to the G3 FAX has been successful.

Once the error message or delivery status notification message has been processed in above steps S3, S4, S9, S10, S11 and S14, the corresponding mail is removed from the mail server (S15).

In the above explanation, the error message is transmitted to the sender by reply mail, but the Internet FAX can be set so that instead of returning the error message to the sender, the error message may be sent do the administrator.

Figure 8:
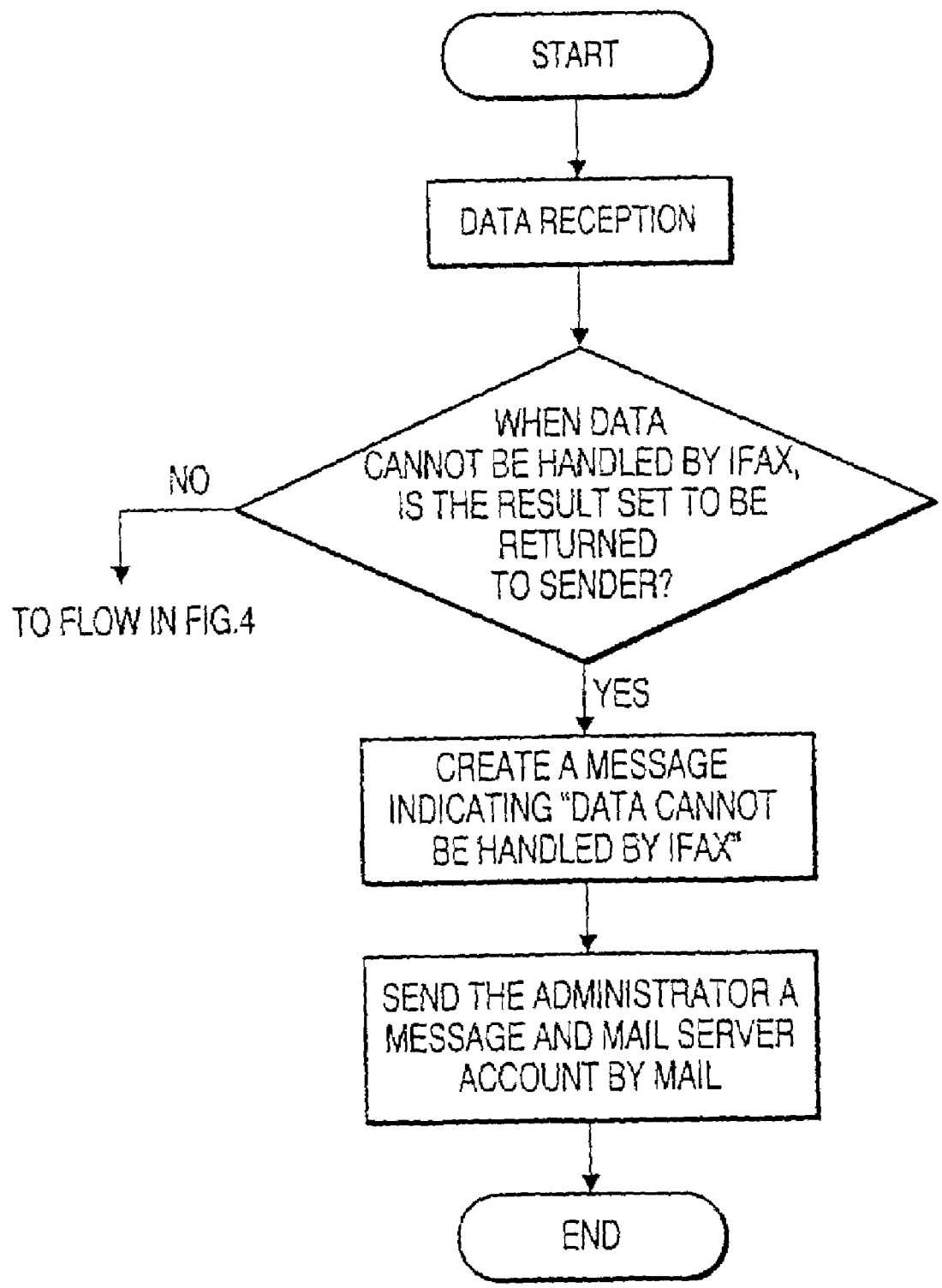
FIG. 8 illustrates a flow chart of an example of modified operation of the Internet FAX of the above embodiment.

FIG. 8 shows a flow chart when an error message is returned to the administrator terminal. As shown in said figure, the setting is checked upon reception of data to decide whether or not the setting is made so that the result may be returned to the sender when it receives data that cannot be handled by the IFAX. When it is set that the result may be returned to the sender, processing is carried out according to FIG. 4.

On the other hand, When it is set that the result will not be returned to the sender, reply message creation section 7 creates a message indicating "data cannot be handled by the IFAX." The account that stores the received E-mail that could not be opened and the mail address of the sender are included in this mail. This mail is transmitted from transmission section 3 to the administrator terminal.

At the administrator terminal that received the above mail, the administrator extracts the account included in the received mail and processes it When the administrator terminal can process it, and When not, it notifies to the sender address included in the received mail that it could not process the received mail. In this way, the error message is delivered to the sender.

As described above in detail, the present invention can provide an Internet FAX that can accurately and simply notify the data that resulted in an error or data that have been received successfully to the sender.

What is claimed is:

1. An Internet facsimile apparatus connected to an administrator via a network, the administrator being distinct from the Internet facsimile apparatus, the Internet facsimile apparatus comprising:
    a receiver configured to receive an e-mail from a sender via the network;
    a printer configured to print the received e-mail, the printer comprising an operational section of the Internet facsimile apparatus; and
    a controller configured to determine whether the received e-mail can be opened in the Internet facsimile apparatus, to print the received e-mail when the received e-mail can be opened in the Internet facsimile apparatus, and to transmit a predetermined notice to the administrator via the network when the received e-mail can not be opened in the Internet facsimile apparatus, the predetermined notice indicating that the received e-mail could not be opened in the Internet facsimile apparatus.

2. The Internet facsimile apparatus according to claim 1, wherein the controller generates the predetermined notice to include an account of the Internet facsimile apparatus and a mail address of the sender.

3. The Internet facsimile apparatus according to claim 1, further comprises a communicator configured to be connected to a telephone network and to receive and transmit facsimile data via the telephone network, the communicator comprising an operational section of the Internet facsimile apparatus.

4. The Internet facsimile apparatus according to claim 1, wherein the predetermined notice is configured to be transmitted by the administrator to the sender.

5. An Internet facsimile apparatus connected to an administrator via a network, the administrator being distinct from the Internet facsimile apparatus, the Internet facsimile apparatus comprising:
    a receiver configured to receive an e-mail from a sender via the network;
    a printer configured to print the received e-mail, the printer comprising an operational section of the Internet facsimile apparatus; and
    a controller configured to determine whether the received e-mail can be printed in the Internet facsimile apparatus based on a format of the received e-mail, to print the received e-mail when the received e-mail can be printed in the Internet facsimile apparatus, and to transmit a predetermined notice to the administrator via the network when the received e-mail can not be printed in the Internet facsimile apparatus, the predetermined notice indicating that the received e-mail could not be printed in the Internet facsimile apparatus.

6. The Internet facsimile apparatus according to claim 5, wherein the controller generates the predetermined notice to include an account of the Internet facsimile apparatus and a mail address of the sender.

7. The Internet facsimile apparatus according to claim 5, further comprises a communicator configured to be connected to a telephone network and to receive and transmit facsimile data via the telephone network, the communicator comprising an operational section of the Internet facsimile apparatus.

8. The Internet facsimile apparatus according to claim 5, wherein the predetermined notice is configured to be transmitted by the administrator to the sender.

9. A method for communicating an e-mail by an Internet facsimile apparatus connected to an administrator, the administrator being distinct from the Internet facsimile apparatus, the Internet facsimile apparatus comprising a printer, the printer comprising an operational section of the Internet facsimile apparatus, the method comprising:
    receiving an e-mail from a sender via the network;
    determining whether the received e-mail can be opened in the Internet facsimile apparatus;
    printing the received e-mail when the received e-mail can be opened in the Internet facsimile apparatus; and
    transmitting a predetermined notice to the administrator via the network when the received e-mail can not be opened in the Internet facsimile apparatus, the predetermined notice indicating that the received e-mail could not be opened in the Internet facsimile apparatus.

10. A method for communicating an e-mail by an Internet facsimile apparatus connected to an administrator, the administrator being distinct from the Internet facsimile apparatus, the Internet facsimile apparatus comprising a printer, the printer comprising an operational section of the Internet facsimile apparatus, the method comprising:
    receiving an e-mail from a sender via the network;
    determining whether the received e-mail can be printed in the Internet facsimile apparatus based on a format of the received e-mail;
    printing the received e-mail when the received e-mail can be printed in the Internet facsimile apparatus; and
    transmitting a predetermined notice to the administrator via the network when the received e-mail can not be printed in the Internet facsimile apparatus, the predetermined notice indicating that the received e-mail could not be printed in the Internet facsimile apparatus.

* * * * *